March 6, 1928. 1,661,386
E. H. REMDE
INDUSTRIAL TRUCK
Original Filed May 4, 1923 3 Sheets-Sheet 1
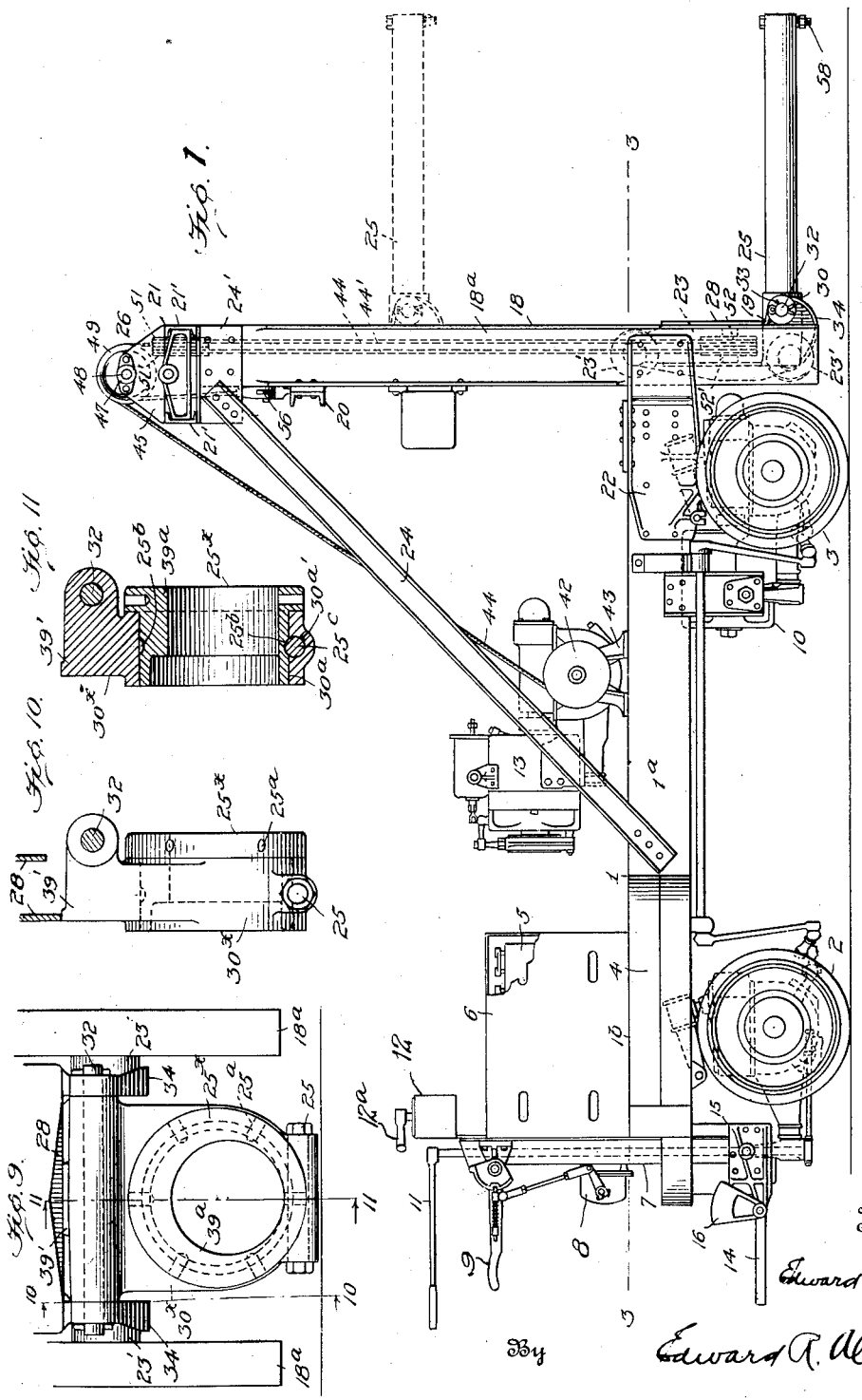

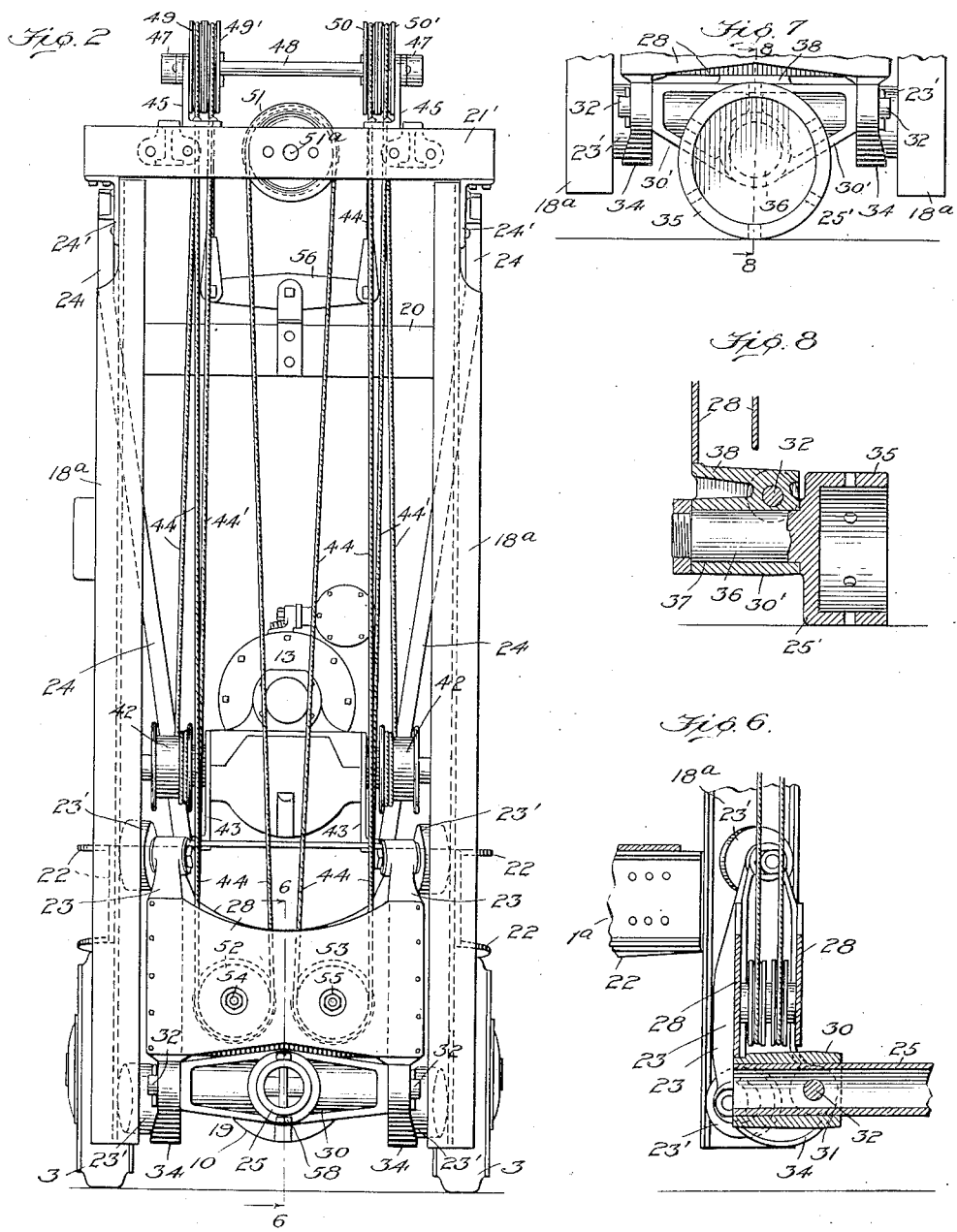

March 6, 1928. 1,661,386
E. H. REMDE
INDUSTRIAL TRUCK
Original Filed May 4, 1923   3 Sheets-Sheet 3
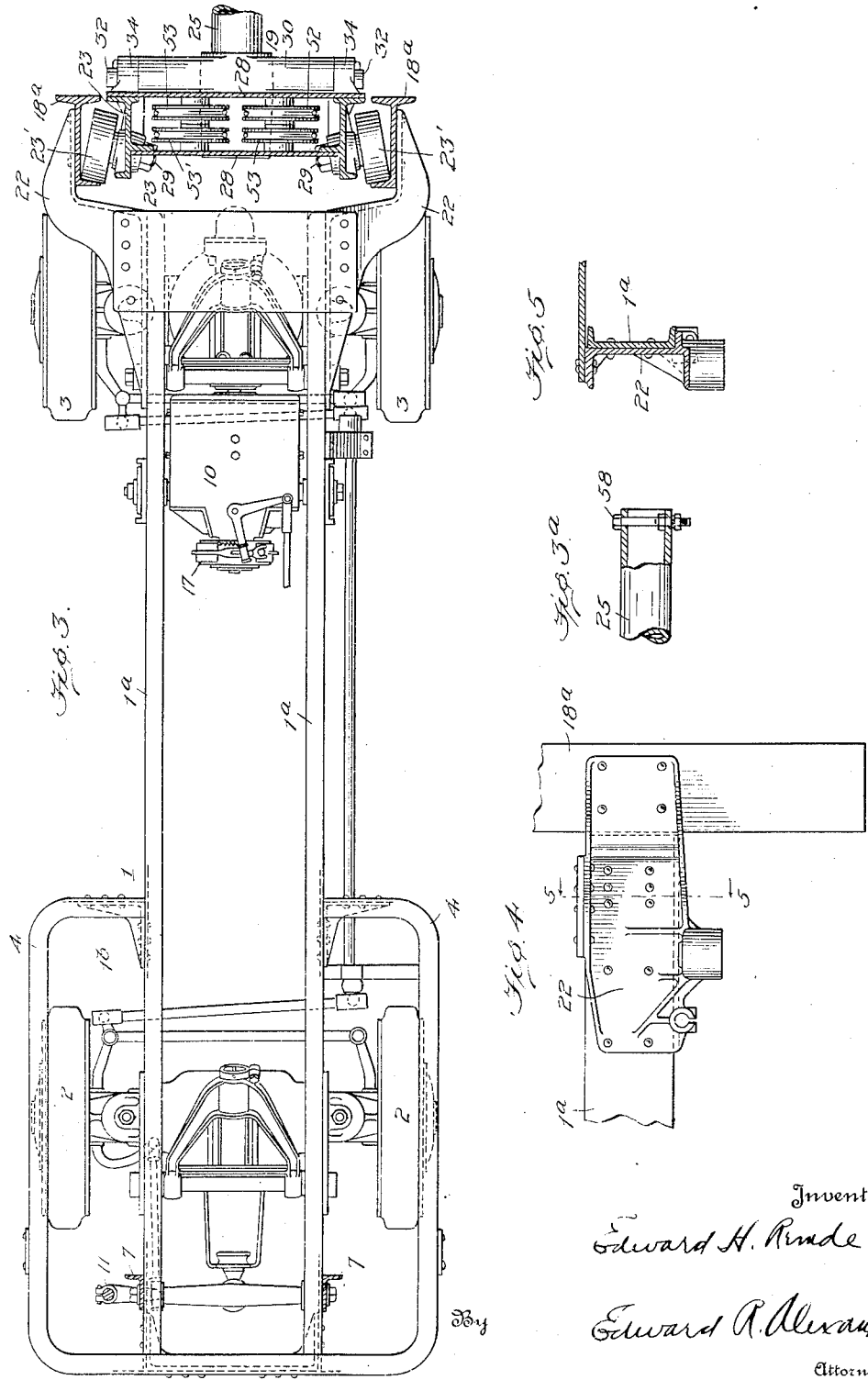

Patented Mar. 6, 1928.

1,661,386

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Application filed May 4, 1923, Serial No. 636,638. Renewed May 31, 1927.

This invention relates to an industrial truck adapted to transport bodies from place to place.

One object of the invention is to construct a truck of this character capable of readily engaging a body or bodies to be transported from place to place.

Another object of the invention is to construct an improved elevating truck in which the lifting member is trunnioned on the guided support whereby danger of distorting or breaking the elevating member or its guides is avoided.

Another object of the invention is to construct an improved truck having engaging and lifting means of simple construction.

Other objects of the invention will be apparent to those skilled in the art to which my invention relates from the following description taken in connection with the accompanying drawings, wherein Figure 1 is a side elevation of a truck embodying my invention.

Figure 2 is an end view of the truck looking from the right of Figure 1.

Figure 3 is a section on line 3—3 of Figure 1.

Fig. 3ª is a fragmentary view of the outer end of the lifting member, with parts broken away to facilitate the illustration.

Figure 4 is a fragmentary side view of a portion of the main frame and guide frame and the bracket for supporting the latter.

Figure 5 is a section on the line 5—5 of Figure 4.

Figure 6 is a fragmentary section on the line 6—6 of Figure 2.

Figure 7 is a fragmentary end elevation showing a modification of the invention.

Figure 8 is a section on the line 8—8 of Figure 7.

Figure 9 is a fragmentary end elevation showing another modification of the invention.

Figure 10 is a section on the line 10—10 of Figure 9.

Figure 11 is a section on the line 11—11 of Figure 9.

In the drawings, 1 indicates a frame suitably supported on wheels 2, 3, preferably two pairs of wheels—see Figure 3. The frame 1 may be of any desired construction, but it preferably consists of a pair of parallel channel bars 1ª and a supplemental frame 1ᵇ forming side sections 4 which extend laterally to a point substantially coincident with the plane of the outer extremities of the wheels 2, to provide guards therefor, as well as a relatively wide base or platform for a plurality of batteries 5. The batteries 5 may be housed within a suitable casing 6. 7 indicates a pair of uprights secured to the bars 1ª adjacent one end or wall of the frame 1ᵇ and serving as rigid supports for suitable brackets or plates for the controlling devices, to wit, a controller 8 and its operating handle 9 for operating a traction or driving motor 10, a steering lever 11 and a controller 12 for the hoisting or elevating motor 13. In the drawings, for illustrative purposes, one pair of wheels 3 is driven and both pairs of wheels are steerable, but it will be understood that such arrangement may be variously changed at will so that either or both pairs of wheels may be driven and either pair steered.

14 indicates a platform for the operative, while operating the truck, to stand on and to actuate the lever 11, handle 9 and the handle 12ª for the controller 12. The platform 14 may be pivoted on a rod supported by a pair of depending brackets 15. The platform 14 may be counterbalanced by a weight 16 to maintain it in upright position when not in use. 17 indicates a brake for the truck, preferably operatively connected with an element driven by the motor 10. The brake 17 is controlled by a pedal (not shown) associated with the platform 14.

18 indicates a guide frame for an elevating member 19, preferably arranged at that end of the frame 1 opposite to the platform 14 and the truck controlling devices.

The guide frame section 18 preferably comprises a pair of channel or I-beams 18ª, rigidly maintained in spaced, parallel relation by a cross member 20 arranged intermediate their ends, a sill 21 disposed at the upper ends of the beams 18ª and connections with the main frame 1 of the construction later to be described. The guide frame 18 preferably extends below the frame 1 to a point adjacent the ground or floor and thereabove to provide sufficient vertical movement for the elevating member 19, to adapt the truck to varying uses and applications in transporting and tiering, or loading and unloading goods or bodies. The guide frame 18 is preferably connected to the main frame 1 by a pair of brackets 22, each riveted at its opposite ends to the frame 1 and the adjacent channel or I-beam 18ᵃ. As shown in the drawings, the channel or I-beams 18ᵃ constituting the guide frame 18 oppose each other, so that the side walls thereof may serve as guides for shoes 23, which are supported between the beams 18ᵃ and form a part of the elevating member 19. 24 indicates a pair of tie rods or bars extending between and connected at their opposite ends to the upper ends of the beams 18ᵃ, or angle plates 24' secured thereto, and the frame 1 and serving to brace the guide frame 18 against movement relative to the main frame 1, due to the weight of the load which at any time may be supported on the engaging and lifting device 25, to be later referred to. The sill 21 preferably comprises a pair of channel bars 21', 21', supported upon and secured to the angle plates 24', each of which is secured to the outer side of one of the I-beams 18ᵃ, in a well known manner. The sill 21 serves to support certain elements of a hoisting or elevating mechanism 26, to which reference will later be made.

The elevating member 19 comprises a pair of shoes 23, already referred to, connected together by a pair of spaced front and rear plates 28 and upper and lower pairs of shoe devices 23', one device of each pair being carried by one of the shoes 23 and engaging the inner opposing side walls of the adjacent beam 18ᵃ. Each shoe device 23' consists of a roller loosely mounted on a stud shaft 29 supported in the wall of the adjacent shoe 23. The shafts 29 are inclined so that the surfaces of the rollers may engage the inclined inner surfaces of the side walls of the adjacent beam 18ᵃ and roll thereon with minimum friction. As will be understood from Figures 2, 3 and 6, the stud shafts 29 carried by each shoe 23 are inclined at an angle relative to each other and are offset relative to the central longitudinal plane of the adjacent beam 18ᵃ, so that the lower roller will engage the rear wall of the beam and the upper roller will engage its front side wall.

The device 25 is arranged to engage a body or bodies to be transported or loaded and unloaded to or from a support or pile or engaged, elevated and transported to some station and lowered. The device 25 is carried by a supporting element 30 which in turn is trunnioned on the elevating member 19 in the manner to be later described. In the form of construction shown in Figures 1, 2, 3 and 6, the engaging and lifting device comprises a relatively long bar 25' preferably round in cross section and hollow from end to end to insure lightness, and adapted to be projected within and engage the inner lateral surfaces of a body or a plurality of bodies to be engaged, lifted and transported, or otherwise moved, for example, tire molds or other annular shaped articles; whereas, in Figures 1, 7, 8, 9, 10 and 11, I have shown a body engaging and lifting device 25' of hollow form having side walls, preferably of annular shape, adapted to engage the outer lateral surfaces of a body to be engaged, lifted and transported, or otherwise moved; for example, the end of a roll used in rolling mills when it has to be re-machined or repaired. In carrying out the operation of the lifting device, the elevating member is first operated to arrange the engaging and lifting device is proper position and thereafter the truck is driven forwardly to give the lifting device a thrust movement. Where the lifting device is of the construction shown in Figures 1, 2, 3, and 3ᵃ, it will be projected within the bodies; whereas in the form of lifting device shown in Figures 7, 8, 9, 10 and 11 it will envelop the body of a portion thereof.

Referring to Figures 1, 2, 3 and 6, the lifting device 25 is fitted at its inner end into an opening 31 formed in the supporting element 30. The supporting element 30 is provided at its opposite sides with trunnions 32, which rotatably fit suitable openings 33 formed in a pair of forwardly projecting arms 34, each integrally connected to one of the shoes 23. By preference, the trunnions constitute a single rod extending through openings formed in the supporting element 30 and wall of the lifting device 25 (see Figure 6). The trunnions 32 serve to removably support the lifting device on the elevating member 19 and also permit the outer end of the lifting member to swing upwardly, so that during its lowering movement, if anything happens to be below it, or the load being lowered, the lifting device may swing upwardly about the trunnions and thus eliminate danger of breakage or distortion of any part of the elevating member, lifting device or other parts of the truck. As clearly shown in Figure 6, the supporting element 30 extends inwardly beyond the axis of the trunnions 32, so that its inner end may engage the lower edge of the inner connecting plate 28 to maintain the lifting device in substantially horizontal position or against movement downwardly.

Referring to Figures 7 and 8, the lifting device 25' comprises an annular wall 35 which, as already set forth, is arranged to engage the outer lateral edges of a body or a portion of a body that is to be lifted, a shank 36 which removably and rotatably fits an opening 37 formed in the supporting element 30' (the latter being trunnioned as already described in connection with Figures 1, 2, 3 and 6) and an arm 38 arranged to engage the rear connecting plate 28;

whereas in Figures 9, 10 and 11 I have shown a slightly different form of hollow lifting device 25ˣ which removably and rotatably fits a suitable opening 30ᵃ formed in the supporting device 30ˣ provided with a wall 39′ to engage the rear connecting plate 28. As will be understood, each of the supporting elements 30′, 30ˣ, is trunnioned on the arms 34 in the manner and for the reasons already set forth in connection with the lifting device 25 shown in Figures 1, 2, 3 and 6. The supporting devices 30, 30′, 30ˣ are preferably each constructed to fit between the arms 34 and be removably supported by the trunnions 32 thereon; accordingly, the devices may be interchanged one with another at will.

It will be noted that the annular wall 35 of the lifting device 30′ shown in Figures 7 and 8 is eccentric to the axis of its shank 36 and that the annular wall 39ᵃ of the lifting device 25ˣ shown in Figures 9, 10 and 11 is eccentric to the axis of the opening 30ᵃ in which it rotates. The purpose of this construction is to permit the annular wall to be adjusted into alignment with the outer lateral surfaces of the body to be lifted to properly engage therewith. For example, after the truck is moved into operative position ready to be given a thrust movement to effect engagement of the lifting device with a body, should it be found that the annular wall of the lifting device is out of alignment therewith, this eccentric mounting of the device permits it to be adjusted, by its rotative movement, to proper alignment position, without moving or repositioning the truck. The rotation of the lifting device 25′ or 25ˣ is effected by inserting a tool in one of the openings 25ᵃ formed in its wall.

At 25ᵇ the outer wall of the lifting device 25ˣ is formed with an annular groove which forms a key-way for a bolt 25ᶜ extending through a transverse opening 30ᵃ′ formed in the supporting element 30ˣ. This construction serves to removably maintain the lifting device 25ˣ in the supporting element 30ˣ, while permitting it to be rotated in the manner set forth.

That form of the invention here illustrated and just described is disclosed and claimed in applicant's copending divisional application for patent filed Feb. 23, 1926, Serial Number 89,968, to which reference is here made.

The hoisting and elevating mechanism 26 is connected to the elevating member 19 and serves to raise the latter to any desired elevation within the limits of the guide beams 18ᵃ (one position of the elevating member 19 being shown in dotted lines in Fig. 1) and to lower the same. The operating means for the hoisting and elevating mechanism preferably include an electric motor 13, already referred to, and winding drums 42 driven thereby. The motor and drums are mounted on standards 43 which are fixed upon the main frame 1, preferably between the battery casing 6 and the guide frame 18. The drums 42 have connected to them flexible members 44, 44′, such as cables—which are operatively connected to the elevating member 19, as will be later described. The elements constituting the operating means herein shown and just referred to are similar in construction to and co-operative like corresponding elements in my co-pending application Serial No. 592,138, filed October 3, 1922, Letters Patent No. 1,567,676, dated December 29, 1925, to which reference may be made, except that, as will be noted in Fig. 1, the standards 43 for the motor supporting cradle are arranged to support the latter and the motor 13 in substantially a horizontal position.

45 indicates hangers mounted on and secured to the channel bars 21′, constituting the sill 21. The hangers are provided with suitable bearings 47 which support the opposite ends of a shaft 48. 49, 49′, and 50, 50′, indicate pairs of sheaves loosely mounted on the shaft 48 and preferably arranged equal distances from a point midway between the guide members 18ᵃ. 51, 51′, indicate a pair of sheaves loosely mounted on a shaft 51ᵃ supported at its opposite ends in the channel bars 21′ and arranged at right angles to the shaft 48 with its axis in a plane preferably midway between the drums 42. 52, 52′, and 53, 53′, indicate pairs of sheaves loosely mounted on shafts 54, 55, respectively, disposed at opposite sides of and equal distance from the plane in which the shaft 51ᵃ is supported and supported at their opposite ends in the plates 28. The ropes, cables or flexible members 44, 44′, run over and around the sheaves and are adapted to be wound on and from the drums 42, to raise and lower the elevating member 19, together with whatever load is to be carried or transported or moved vertically by the lifting device carried thereby. The rope 44 extends from one drum 42 over the sheave 49, then around the sheave 52 and then over the sheave 51. From the sheave 51, the rope 44 runs around the sheave 53 and then around the sheave 50, its free end being connected to one end of an equalizing element 56, which is pivoted on a pivot 57, disposed in the plane of the shaft 51ᵃ, and supported by the cross bar 20. The other rope 44′ extends from the adjacent drum 42 over the sheave 50′, then around the sheave 53′ and then over the sheave 51′. From the sheave 51′ the rope 44′ runs around the sheave 52′ and then over around the sheave 49′, its free end being connected to the opposite end of the equalizing element 56. The operation of winding the ropes 44, 44′, on the drums 42 and unwinding them therefrom to raise and lower the elevating member will be readily understood. From the foregoing description, it will be seen that the ropes 44, 44′, are wound on and off drums which are disposed at opposite sides of the central longitudinal plane of the truck frame, or a point which is midway between the guide members; also that the rope wound on and off one drum is carried over sheaves which are arranged equal distances from this point and connected to the end of the equalizing element, which is arranged on that side of the central longitudinal plane of the truck remote from the drum. By this arrangement the pull on the ropes incident to raising and lowering the elevating member its load is equalized so that the force acts simultaneously through the sheaves 52, 52′, 53, 53′, and the shafts therefor, to operate the elevating member vertically and in a direction parallel to the guide members 18ª thereby eliminating any tendency to pull on or raise or lower one side of the shoe member faster than the other side. As a result, the elevating member 19 is guided freely between the guides 18ª in its vertical movements without undue friction or binding therein or strains on the elevating mechanism. Furthermore, in winding on and from the drums and running around the guide sheaves, the tension in both ropes is the same, so that they (1) operate uniformly in running over and around the sheaves and (2) wear substantially equally.

58 indicates a device adjustably and removably supported on or near the free end of the lifting device 25 and serving to prevent the articles mounted thereon from sliding off its free end. The device 58 may be of any desired construction, such as a headed rod held in adjusted position by a nut.

To those skilled in the art to which my invention relates, many modifications and widely differing embodiments of the invention and applications thereof will suggest themselves without departing from the spirit and scope thereof. The descriptions and the disclosure herein are purely illustrative and are not intended to be in any sense limiting.

What I claim is:

1. In apparatus of the class described, the combination of a truck frame having supporting wheels, a guide frame disposed vertically and supported by said truck frame at one end thereof and extending above and below said frame, a member movable upwardly and downwardly in said guide frame, means carried by said truck frame and connected with said movable member for moving it, and an element trunnioned at its inner end on said movable member and extending horizontally therefrom for engagement with the lateral surfaces of a body by a thrust movement, whereby the latter may be lifted, said element engaging said movable member at a point remote from the axis of its trunnions to maintain said element against movement downwardly.

2. In apparatus of the class described, the combination of a truck frame having supporting wheels, a guide frame disposed vertically and supported by said truck frame at one end thereof and extending above and below said frame, a member movable upwardly and downwardly in said guide frame, means carried by said truck frame and connected with said movable member for moving it, and an element trunnioned on said movable member and extending horizontally therefrom for engagement with the lateral surfaces of a body by a thrust movement, whereby the latter may be lifted, said element engaging said movable member at a point remote from the axis of its trunnion to maintain said element against movement downwardly, and the trunnion of said member being removable.

3. In apparatus of the class described, the combination of a truck frame having supporting wheels, a guide frame disposed vertically and supported by said truck frame at one end thereof and extending above and below said frame, a member movable upwardly and downwardly in said guide frame, means carried by said truck frame and connected with said movable member for moving it, and an element trunnioned on said movable member and extending horizontally therefrom for engagement with the lateral surfaces of a body by a thrust movement whereby the latter may be lifted, the rear end of said element engaging said member rearward of its trunnion to maintain the former against downward movement.

4. In apparatus of the class described, the combination of a truck frame having supporting wheels, a pair of guide frames disposed vertically on said truck frame, a member movable upwardly and downwardly in said guide frames, said member comprising a pair of shoes slidably engaging said guide frames and a connecting plate for said shoes, an element trunnioned on said member and extending horizontally therefrom for engagement with the lateral surfaces of a body by a thrust movement, whereby the latter may be lifted, the inner end of said element engaging said connecting plate to prevent movement of its outer end downwardly, and means carried by said truck frame and connected with said movable member for operating it.

5. In apparatus of the class described, the combination of a truck frame having supporting wheels, a pair of guide frames disposed vertically on said truck frame, a member movable upwardly and downwardly in said guide frames, said member comprising a pair of shoes slidably engaging said guide frames and a connecting plate for said shoes, an element trunnioned on said member, a lift device extending horizontally from and removably supported by said element for engagement with the lateral surfaces of a body by a thrust movement, whereby the latter may be lifted, and means carried by said truck frame and connected with said movable member for operating it, the inner end of said element engaging said connecting plate to prevent downward movement of the outer end of said lift device.

6. In apparatus of the class described, the combination of a truck frame having supporting wheels, a pair of guide frames disposed vertically on said truck frame, a member movable upwardly and downwardly in said guide frames, said member comprising a pair of shoes slidably engaging said guide frames and a connecting plate for said shoes, an element removably trunnioned on said member and engaging the under side of said connecting plate to prevent its movement in one direction, a lift device extending horizontally from and removably supported by said element for engagement with the lateral surfaces of a body by a thrust movement, whereby the latter may be lifted, and means carried by said truck frame and connected with said movable member for operating it.

7. In apparatus of the class described, the combination of a truck frame having supporting wheels, a pair of guide frames disposed vertically on said truck frame, a member movable upwardly and downwardly in said guide frames, said member comprising a pair of shoes slidably engaging said guide frames and a connecting plate for said shoes, an element trunnioned on said member and engaging the under side of said connecting plate to prevent its movement in one direction, said element being formed with an opening through it at right angles to the axis of its trunnions, a lift device removably supported in said opening and extending horizontally from said element for engagement with the lateral surfaces of a body by a thrust movement, whereby the latter may be lifted, and means carried by said truck frame and connected with said movable member for operating it.

8. In apparatus of the class described, the combination of a truck frame having supporting wheels, a guide frame disposed vertically and supported by said truck frame at one end thereof and extending above and below said frame, a member movable upwardly and downwardly in said guide frame, means carried by said truck frame and connected with said movable member for moving it, and an element trunnioned at its inner end on said movable member and extending horizontally therefrom for engagement with the lateral surfaces of a body by a thrust movement, whereby the latter may be lifted, said element engaging said movable member at a point remote from the axis of its trunnions to maintain said element against movement downwardly and a device on the outer end of said lifting element arranged to prevent the body from sliding off therefrom.

In testimony whereof, I have hereunto subscribed my name.

EDWARD H. REMDE.